3,508,592
SEALED PRESS NUT HAVING A SPRING RETAINED FLOATING NUT ELEMENT
José Rosán, Sr., Rancho San Juan, San Juan Capistrano, Calif. 92675; Robert D. Weber, 1955 Irvine Ave., Costa Mesa, Calif. 92627; and Marvin P. Reece, 33262 Bremerton Ave., Dana Point, Calif. 92629
Filed Sept. 3, 1968, Ser. No. 757,004
Int. Cl. F16b *39/00, 39/28*
U.S. Cl. 151—41.7      8 Claims

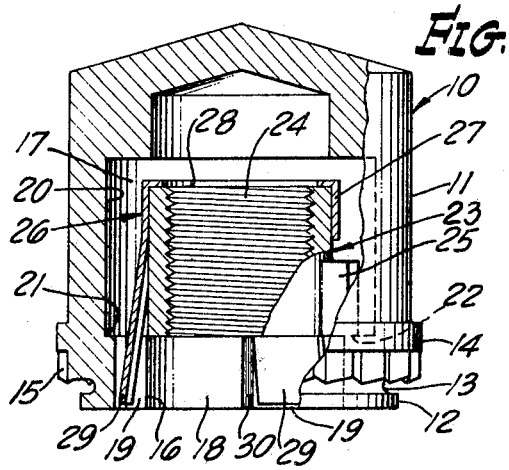
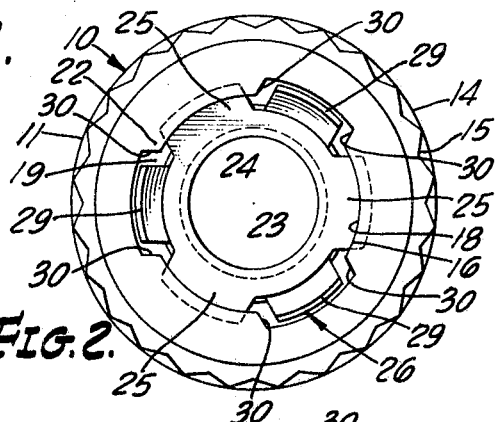
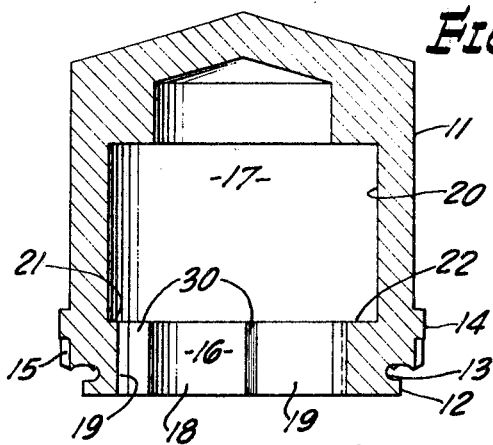
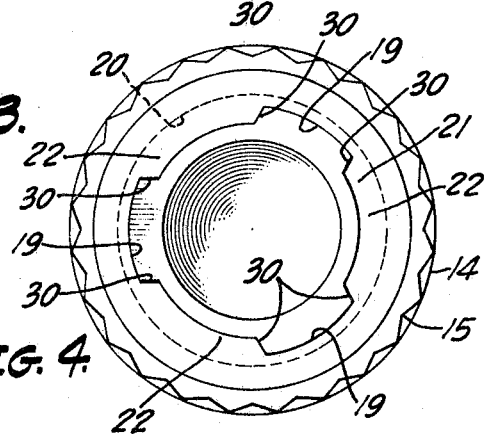
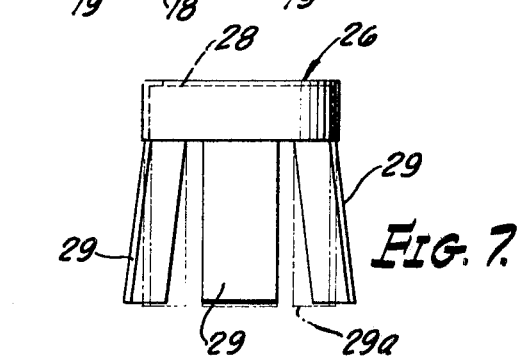
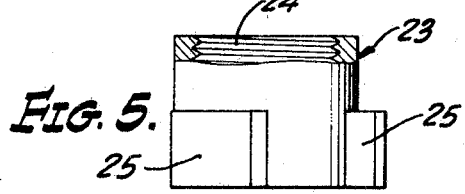
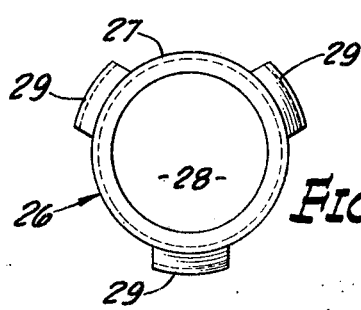
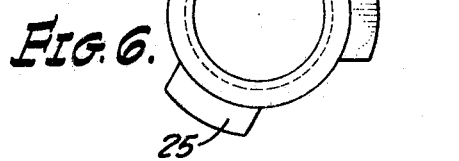
INVENTORS
JOSÉ ROSÁN, SR.
ROBERT D. WEBER
MARVIN P. REECE
BY
ATTORNEY › # United States Patent Office 3,508,592
Patented Apr. 28, 1970

ABSTRACT OF THE DISCLOSURE

A sealed, leak-proof press nut comprised of an enclosed shell element and a floating threaded nut element contained therein which is prohibited from rotational movement relative to the shell element by an expanded spring means simultaneously interengaging the nut and shell elements and prohibited from axial displacement by the engagement of radial lugs carried by the nut element with internal abutment shoulders provided by the shell element.

---

This invention relates to sealed press nuts and particularly to sealed press nuts having a floating nut element retained therein.

Prior fastening devices having the concomitant purposes of accommodating a threaded element such as a screw or bolt and yet prohibit the leakage of fluid or gas via the thread convolutions, primarily utilized an encasement means for maintaining the fastener assembly within the encasement, and thereafter attaching the fastening structure to the workpiece by complicated securement means. An additional problem was presented when it was desired to provide a fastening means which was adjustable so as to be utilized with misaligned holes in the workpieces. The fasteners heretofore used to accomplish the foregoing have been expensive to manufacture and install.

The fastening device of the instant invention overcomes the foregoing disadvantages by utilizing a press nut having an enclosed shell provided with an annular pilot flange, an annular groove adjacent thereto and an overlying impact flange provided with a plurality of longitudinal serrations thereabout to securely lock the fastener into a workpiece by embedding the overlying flange about the periphery of a workpiece bore, thereby forming an integral mechanical lock therewith, as is well known in the art. The shell is provided with a restricted opening at one end thereof and with an enlarged hollow chamber connected with said restricted opening.

The wall of the restricted opening is provided with a plurality of longitudinally extending grooves which intersect the abutment shoulder extending laterally inwardly from the wall of the enlarged hollow cavity so as to interrupt the same, thereby producing a plurality of intermittent arcuate abutment shoulders.

Positioned within said cavity is an internally threaded nut element having a plurality of radially projecting lugs. The lugs are seated upon the abutment shoulders provided by the shell element, thereby prohibiting the axial displacement of the nut from within the shell.

Superimposed upon said nut element is a retainer element provided with a cap that seats upon said nut element and is provided with a plurality of resilient segments which, due to the aforesaid resilient property thereof, are outwardly flexed so as to be accommodated within the wall grooves of the restricted opening of the outer shell. Concomitantly, said expanded resilient segments are also interposed between the lugs carried by the internal nut element. It is evident from the foregoing description that the expanded resilient segments of the retainer element which are positioned between the lugs of the internal nut and simultaneously accommodated in the wall grooves of the shell prohibit the rotational movement of the internal nut.

Since the cap of the retainer is slightly larger than the body of the nut element, and the expanded resilient segments of the retainer have a width less than the space between the nut lugs and the width of the wall grooves of the shell, said nut element is capable of limited movement in a rotational as well as in a lateral direction, thereby imparting a "floating" characteristic to the nut element relative to the shell so that the nut can be self-adjusting in the event of misalignment of the workpiece bore.

It is evident from the foregoing that a sealed leakproof fastener is provided having a self-alignment characteristic which is simple and inexpensive to manufacture, install and use.

Accordingly, it is the primary object of this invention to provide a simple and inexpensive sealed press nut that is leak-proof and capable of self-adjusting for workpiece bore misalignment.

Another object of the invention is to provide a simple and inexpensive sealed press nut that is leak-proof and provides a floating nut element which is allowed limited movement in an axial and lateral direction, but is prevented from substantial rotational or axial movement.

Still another object is to provide a simple and inexpensive sealed press nut that is leak-proof and has self-adjustment fastener characteristics which utilizes a spring retainer to limit the rotational movement of the self-adjusting fastener means.

Other objects and advantages of the present invention will be apparent from the following description taken in conjunction with the accompanying drawings, in which:

FIG. 1 shows an elevational view of the fastener of the instant invention wherein the outer shell, the self-adjusting nut element and the retainer means contained therein are partly in section.

FIG. 2 is a bottom plan view of the fastener illustrated in FIG. 1.

FIG. 3 is an elevational view, in section, of the outer shell element of the fastener illustrated in FIG. 1.

FIG. 4 is a bottom plan view of the outer shell element illustrated in FIG. 3.

FIG. 5 is an elevational view, partly in section, of the self-adjusting nut element illustrated in FIG. 1.

FIG. 6 is a top plan view of the self-adjusting nut element illustrated in FIG. 5.

FIG. 7 is an elevational view of the retainer means illustrated in FIG. 1, wherein the extended resilient segments thereof are slightly outwardly flexed and the inwardly flexed position thereof is shown in dot and dashed lines.

FIG. 8 is a top plan view of the retainer means illustrated in FIG. 7.

Referring more particularly to FIG. 1, reference numeral 10 designates generally the sealed fastener of the instant invention which is comprised of an external shell 11 having an annular pilot flange 12, and annular groove 13 adjacent thereto and an overlying impact flange 14 provided with longitudinally extending teeth 15. As is well known in the art, the combination of pilot flange 12, impact flange 14 provided with longitudinal peripheral serrations 15, spatially separated by annular groove 13, cooperate to provide, when driven into a workpiece bore, a permanent, mechanical, integral lock securing fastener 10 and its components to a workpiece (not shown). Outer shell 11 is provided with a restricted opening 16 and an enlarged hollow chamber 17. The wall 18 of restricted opening 16 is provided with longitudinally extending grooves 19 (as best seen in FIG. 4) which are adapted to accommodate the lugs of the self-adjusting nut element (as will hereinafter be more fully described) during the initial course of installing the nut element within outer shell 11.

Wall 20 of enlarged hollow chamber 17, being further disposed from the axis of the outer shell than wall 18 of restricted opening 16, forms an internal abutment shoulder 21 which is intersected by the grooves 19 so as to provide a plurality of intermittent arcuate abutment shoulders 22. Although three arcuate abutment shoulders are illustrated, this number is a function of the number of grooves 19 utilized, which is in turn a function of the number of lugs carried by the self-adjusting nut element.

Self-adjusting nut element 23 has an internally threaded bore 42 and a plurality of radially extending lugs 25 (as base seen in FIGS. 5 and 6). It should be noted that the number of lugs 25 carried by the self-adjustable nut element 23 are equal to the number of slots 19 and arcuate shoulders 22 provided by outer shell 11. Thus, after the nut element is inserted into the outer shell, the nut element is given a one-sixth of a turn so that the lugs are longitudinally positioned above the arcuate abutment shoulders 22. While in this position the aforesaid arcuate abutment shoulders prohibit the axial displacement of the nut element from within outer shell 11.

Superimposed upon self-adjusting nut element 23 is retainer means 26 which is provided with a cap portion 27 having an opening 28 passing therethrough. Cap portion 27 of retainer 26 is seated upon the upper portion of self-adjusting nut element 23 so that the resilient segments 29 carried by the retainer 26 are accommodated in the spaces between lugs 25 of self-adjusting nut element 23. Further, resilient segments 29 are simultaneously accommodated in longitudinal grooves 19 of the restricted opening 16 of outer shell 11. Thus, it should be obvious from the foregoing that since the resilient segments 29, which are interposed between lugs 25 of nut element 23, are prohibited from rotational movement due to the restriction of resilient segments 29 by the side walls 30 of longitudinal grooves 19, afortiori, any substantial rotational movement of self-adjusting nut element 23 is also prohibited or prevented.

The width of resilient sagments 29 are less than the width of grooves 19 and the space between lugs 25 of nut element 23 so that although, as aforesaid, substantial rotational movement of nut element 23 is prevented, a limited amount of rotational movement is allowed. Further, since the maximum lateral expansion of resilient segments 29 are equal to, or less than, the radial depth of grooves 19, a limited amount of lateral movement is permitted nut element 23.

The fastener of the instant invention is assembled by first positioning cap 27 over the upper end of nut element 23 so that resilient segments 29 are positioned in the gaps between lugs 25 of said nut element. This combined subassembly is inserted through the restricted opening 16 of outer shell 11 by first rotating nut element 23 until lugs 25 thereof are in longitudinal alignment with said grooves 19. The subassembly is then axially inwardly displaced through the restricted opening 16 into the expanded hollow chamber 17 of outer shell 11. Once lugs 25 of nut element 23 are axially inwardly displaced beyond the uppermost end of annular abutment shoulder 21, said nut element is rotated in either direction approximately one-sixth of a turn so that lugs 25 are positioned longitudinally opposite arcuate abutment shoulders 22.

As a result of such rotation, resilient segments 29, which had been inwardly depressed while passing through restricted opening 16 of outer shell 11, concomitantly are rotated so that said resilient segments are positioned laterally opposite grooves 19. The depressed resilient segments 29 will consequentially outwardly expand, due to the resilient properties thereof, into grooves 19 as aforesaid. The fastener is then ready for installation in a workpiece.

Although only three lugs and corresponding grooves are illustrated, it should be noted that any number of lugs and grooves can be utilized, however, at least the same number of grooves must also be provided. It should be further noted that increasing the number of lugs carried by nut element 23 would require an attendent increase in the number of grooves 19. The width of arcuate abutment shoulders 22 would correspondingly diminish so that the lateral mobility (float) of the nut element 23 is reduced since the surface between the lugs and arcuate abutment shoulders which is available for abutting interengagement is diminished.

Although the retainer is shown and described as having a number of resilient segments equal to the gaps between lugs 25 carried by nut element 23, the resilient segments could be of any number provided they do not exceed the number of gaps existing between said lugs. The thickness of resilient segments 29 is such that the combined overall diameter across resilient segments 29 when positioned within the gaps between lugs 25 of nut element 23 is less than the diameter across the restricted opening 16 of outer shell 11 so that the insertion of nut element 23 and retainer 26 superimposed thereon is not obstructed while assembling the same within outer shell 11.

While one embodiment of the invention has been described, it is understood that the particular embodiment of the invention herein disclosed is for illustrative purposes only and that various changes may be made therein without departing from the principles of the invention.

We claim:

1. A self-adjusting sealed press nut comprising:

an outer shell being closed at one end thereof, said shell provided with an external flange and groove means for securing the same concentrically with a workpiece bore, said shell having an enlarged hollow chamber, said hollow chamber being interconnected with the other end of said shell by a restricted opening, said restricted opening having longitudinally extending groove means situated in the wall thereof, said shell being provided with internal abutment shoulder means at the inner ends of said groove means;

self-adjusting nut means positioned within said shell, said nut means provided with laterally projecting lug means, said lug means being longitudinally engaged with the internal abutment shoulder means provided by said shell; and retainer means having radial shoulder means at one end thereof seated on said nut means, said retainer means provided with longitudinally extending outwardly flexed, resilient segment means, said segment means being circumferentially spaced and receiving said nut lug means therebetween in limited rotatable relationship, the free ends of said resilient segment means being resiliently engaged with said groove means.

2. A self-adjusting sealed press nut as described in claim 2, wherein the number of lugs does not exceed the number of grooves and the width and length of the lugs are less than the width and length, respectively, of the grooves.

3. A self-adjusting sealed press nut as described in claim 1, wherein the width of the resilient segments is less than the width of the longitudinally extending grooves and the maximum lateral dimension of the retainer means is less than the minimum lateral dimension of the restricted opening of the shell excluding the groove means.

4. A self-adjusting sealed press nut as described in claim 1, wherein the number of resilient segments does not exceed the number of gaps between the lugs provided by the nut means, and said resilient segments extend longitudinally beyond the lugs of said nut means.

5. A self-adjusting sealed press nut as described in claim 1, wherein the restricted opening in the end of the shell has a maximum lateral dimension less than that of the enlarged hollow chamber.

6. A self-adjusting sealed press nut as described in claim 1, wherein the internal abutment shoulder means is intersected by the groove means and is comprised of a plurality of arcuate abutment shoulders.

7. A self-adjusting sealed press nut as described in claim 1, wherein the maximum lateral dimension of the nut element exclusive of the lug means is less than the minimum lateral dimension of the retainer means.

8. A self-adjusting sealed press nut as described in claim 1, wherein said nut means is provided with an axially threaded bore and said retainer means seated thereon is provided with an opening therein substantially concentrically positioned relative to the bore of said nut means.

References Cited

UNITED STATES PATENTS

| 3,241,591 | 3/1966 | Rosán et al. | 151—41.7 |
| 3,373,789 | 3/1968 | Parkin et al. | 151—41.76 X |

FOREIGN PATENTS

| 870,921 | 6/1961 | Great Britain. |

RAMON S. BRITTS, Primary Examiner

PO-1050
(5/69)

UNITED STATES PATENT OFFICE
CERTIFICATE OF CORRECTION

Patent No. 3,508,592          Dated April 28, 1970

Inventor(s) José Rosán, Sr., Robert D. Weber and Marvin P. Reece

It is certified that error appears in the above-identified patent and that said Letters Patent are hereby corrected as shown below:

Column 2, line 62, "and" should read --an--.
Column 3, line 17, reference numeral "42" sould read --24--, line 18 "base" should read --best--, line 45, "sagments" could read --segments--.
Column 4, line 8 "attendent" should read --attendant--.
Column 4 (Claim 2) line 60, "2" should read --1--.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents